May 30, 1961 T. E. MYERS 2,986,709

INTERMITTENT OSCILLATOR

Filed March 4, 1959

INVENTOR.
Thomas E. Myers
BY
Bacon & Thomas
ATTORNEYS

United States Patent Office 2,986,709
Patented May 30, 1961

2,986,709

INTERMITTENT OSCILLATOR

Thomas E. Myers, P.O. Box 367, Geneva, Ill.

Filed Mar. 4, 1959, Ser. No. 797,197
2 Claims. (Cl. 331—117)

This invention relates to electronic circuits, and particularly to a circuit employing transistors for producing a spaced pulse output through a load device.

Very briefly, the invention comprises a controlling resistance-capacity circuit including a source of direct current, for controlling the time of conduction of an output transistor and the time between output pulses. A distinctive feature of this invention is that the load may be either resistive or substantially purely inductive even though the source of power is direct current. The circuit is such that upon connection to an inductive load, such as the primary winding of a transformer, the output current oscillates whereby the inductive device will be operative in accordance with its intended mode of operation. Components of the circuit may be varied in value either by substitution or adjustment whereby the time between pulses and the duration of each pulse can be independently predetermined and accurately regulated.

It is therefore an object of this invention to provide an intermittently conductive circuit for either an inductive or resistive load.

It is a further object of this invention to provide a circuit of the type set forth wherein the time intervals between output pulses and the length of those pulses may be controlled at will.

It is a still further object of this invention to provide an electronic circuit of the type described which, when connected to an inductive load will produce oscillating wave trains whereby the inductive load is properly energized.

Another object of the invention is to provide a novel circuit of the type set forth which is efficient and reliable in operation and economical to construct.

Further and additional objects will become apparent to those skilled in the art as the description proceeds with reference to the accompanying drawings, wherein.

Figure 1:
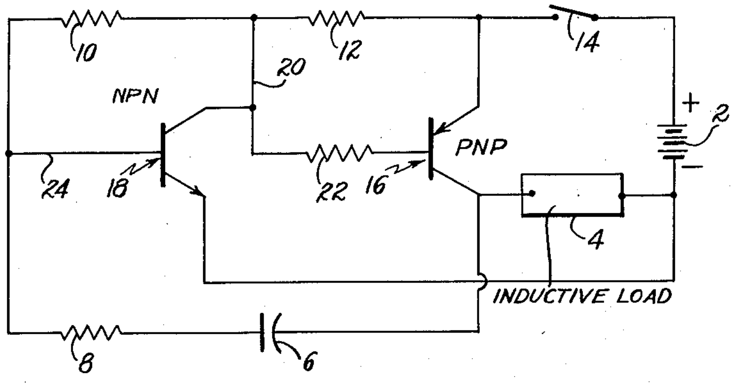
Fig. 1 is a schematic diagram of a circuit embodying the present invention.

The circuit shown in Fig. 1 comprises a primary control circuit including battery 2 in series with the load 4, capacitor 6, resistance means 8, further resistors 10 and 12, and an OFF-ON switch 14. The components enumerated are connected by suitable conductors to form the series circuit described. An output or load transistor 16, of the PNP type, is connected across the load 4 and battery 2 by having its emitter connected into the control circuit between resistor 12 and switch 14 and by having its collector electrode connected directly to the junction between load 4 and capacitor 6. A control transistor 18 is arranged with its emitter electrode connected directly to the negative side of the battery or power source 2, or directly to the junction between battery 2 and load 4 and by having its collector electrode connected, through conductor 20 and resistor 12, to the upper side of battery 2. A further connection, including resistor 22, connects the collector electrode of the control transistor 18 to the base of the output or load transistor 16. A conductor 24 connects the base of the control transistor 18 to the previously described control circuit between resistors 8 and 10. In other words, the base of transistor 18 is connected to the control circuit at the end of resistor 8 which is remote from capacitor 6. Thus capacitor 6 and resistor 8 are between the base of transistor 18 and the power source 2. The resistor 8 and capacitor 6 constitute the RC control for the circuit. As indicated on the drawings the load or output transistor 16 is of the PNP type, whereas the control transistor 18 is of the NPN type. The transistors 16 and 18 are normally non-conductive until their respective bases are appropriately biased.

To set the circuit in operation, it is only necessary to close the OFF-ON switch 14 whereupon a small current flows from the battery 2 through load 4, thence to capacitor 6 to charge the same. The rate at which the capacitor becomes charged is dependent largely upon the value of resistance means 8 and the value of resistance at 10 and 12. During the period when current is flowing in the control circuit to charge capacitor 6, a voltage drop appears across resistor 10 and since the ends of resistor 10 are connected to the base and collector, respectively, of transistor 18, that transistor is biased to cut off. When capacitor 6 approaches or reaches full charge, current flow through the controlling circuit ceases and the charge on capacitor 6 biases the base of transistor 18 to conduction. When transistor 18 starts to conduct, current flows from the battery 2 to the emitter of transistor 18, then to its collector, conductor 20, and back to the battery. At the same time the output potential of transistor 18 is impressed on the base of the output or load transistor 16 to bias that transistor to conduction. At that time a large current flows from the battery 2 through the load 4 and transistor 16 back to the battery. This is the output circuit. It is to be noted that during the initial charging of capacitor 6 immediately after closing the switch 14, the current flow in the controlling circuit is so restricted by the resistors therein that not sufficient current flows through the load 4 to energize the same. If the load 4 is resistive its resistance is such a small part of the entire control circuit resistance that the voltage drop thereacross is very small and the load is thus not energized. If the load 4 is purely inductive, its resistance to the flow of direct current is substantially zero and thus the load would not be energized during the initial charging cycle previously described.

As soon as the transistor 16 renders the load circuit conductive, as described, the potential at the junction between the load 4 and transistor 16 becomes positive (since substantially the entire battery voltage is dropped across load 4 during this output cycle). The positive potential at the junction referred to results in discharge of capacitor 6 and impressing an opposite charge thereon. However, the rate of discharge of capacitor 6 and the rate at which it assumes a charge of opposite polarity is again dependent on the value of resistance means 8. Thus, transistor 16 will conduct and load 4 will remain energized until such time as the capacitor 6 is not only completely discharged but starts to charge to the opposite polarity. When such condition is reached the base of transistor 18 is biased to cut off, the entire circuit stops conducting, and the load is de-energized. Thereupon, the small starting current previously described flows through the load and control circuit to hold the base of transistor 18 biased to cut off and to effect reverse charging of capacitor 6 as initially described whereupon the above-described cycle is repeated.

Obviously, the load 4 may be only resistive such as an incandescent lamp, in which case the biasing of transistor 16 to conduction will result in a steady direct current flow through the load to energize the same. On the other hand, if the load 4 is inductive, a different result occurs. For example, the load 4 may consist of a neon lamp driven by a transformer, the primary winding of which is connected in the control circuit as the load 4.

When such an inductive load is employed, conduction through transistor 16 results in the direct current flow through the inductive load but such current flow is ineffective to energize the load. However, some current also flows from load 4 to capacitor 6 and through the control circuit previously described. It is to be noted that the control circuit now includes an inductance 4 and a capacitor 6 which makes that circuit series-resonant. Thus, an oscillating signal appears in the control circuit and is fed through conductor 20 to the base of transistor 16. The oscillating signal applied to transistor 16 results in an oscillating output through that transistor and in the output circuit. The rapidly oscillating pulse periodically appearing in the output circuit is capable of driving the transformer at 4 and thus the inductive load is satisfactorily energized.

Figure 2:
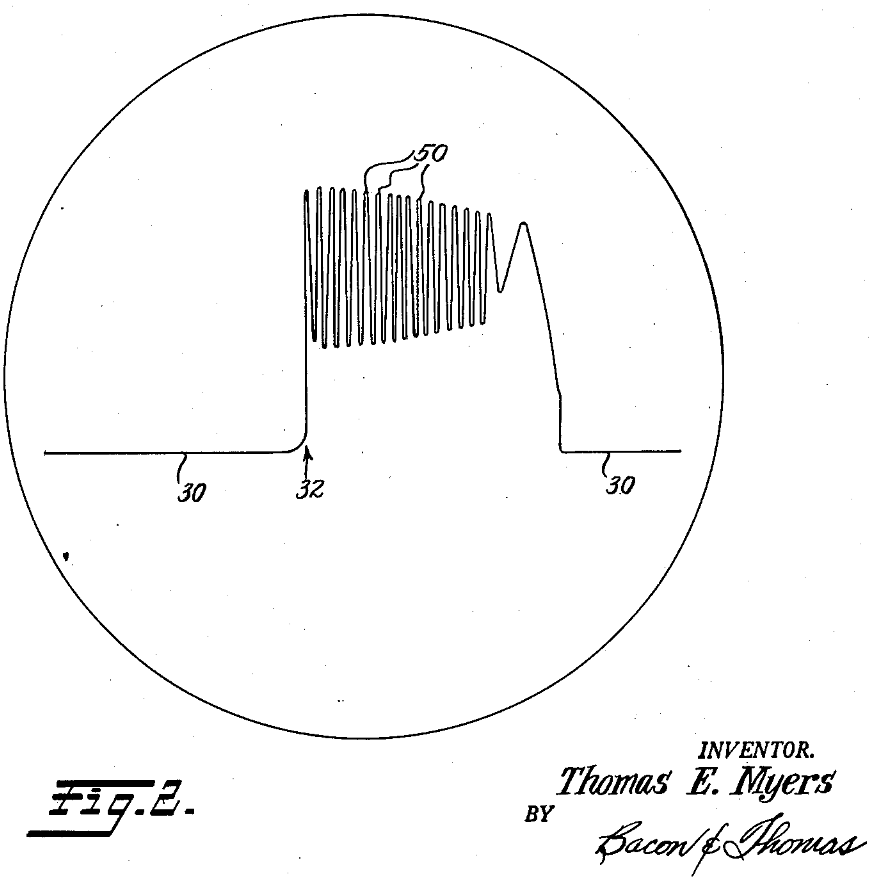
Fig. 2 is a representation of an oscilloscope trace of a single compound cycle of a wave train produced by the circuit of Fig. 1.

Fig. 2 shows the variations in current in the output circuit when an inductive load is employed. The base line 30 represents the period during which the transistors are biased to cut off and represents at least a portion of the interval between output pulses in the load circuit. As Fig. 2 shows, upon the biasing of transistor 16 to conduction (at point 32), the current flow in the output circuit suddenly rises to a peak value and begins immediately to oscillate at high frequency with its maximum and minimum values both well above the cut off value represented by line 30. The oscillations gradually dampen to a point where the individual cycle cuts off and the current drops to zero, then immediately rises to begin another oscillation in the wave train (repeating the trace of Fig. 2) while capacitor 6 receives a sufficient reverse charge to bias the base of transistor 18 to cut off whereupon the load 4 is suddenly de-energized and the described combination cycles are repeated.

By way of example only, a circuit was constructed as described and shown employing a 6-volt battery and capacitor 6 of 5 mfd. capacity. In that circuit the resistor 8 was 6.8K ohms, resistor 10 was of 330K ohms, resistor 12 was 6.8K ohms, and resistor 22 was of 470 ohms. With the values specified it was found that the output pulses (complete trace of Fig. 2) through an inductive load occurred at a frequency of 180 c.p.s. and that the oscillation waves 50 at the plateau of each output pulse were of a frequency of 12,500 cycles per second.

In the described circuit the capacitor 6 basically controls the length of the wave train, that is, the number of sequential pulses of the general form of Fig. 2 and the length of time between wave trains. Thus, capacitor 6 controls the frequency of the wave trains. The value of resistor 8 controls the length of the output period, which is decreased by decreasing the value of that resistor and is increased by increasing the resistance at 8. The length of the OFF period is decreased by decreasing the value of resistor 10 but such an adjustment also increases the frequency, necessitating readjustment of capacitor 6 or resistor 8 if the same frequency is desired. When the output circuit is not conducting, a circuit of the present invention requires only about .5 ma. of current to drive it. Applicant has found that the circuit described herein can be regulated so that the output period of compound wave trains can be continuous or shortened to $\frac{1}{180}$ of a second.

The dwell period can be eight minutes or longer to zero.

While the schematic diagram of Fig. 1 shows the capacitor and resistors as of fixed value, it is obvious that the described adjustments for the circuit may be accomplished either by substituting other fixed value components or by employing variable or adjustable resistors and/or capacitor.

While a single specific embodiment of the invention is shown and described herein, it is to be understood that other modifications are contemplated within the scope of the appended claims.

I claim:

1. In an electronic circuit: a control circuit comprising; a source of direct current, an inductive load, a capacitor, and resistive impedance means serially connected in said order to define a closed series circuit; a control transistor having its emitter electrode connected to said control circuit at a first junction between said source and load; its base connected to said control circuit at a second junction, and its collector electrode connected to said control circuit at a third junction; said load and capacitor being between said first and second junctions and, said second junction being between said capacitator and third junction; at least a portion of said resistive impedance being between said second and third junctions; an output transistor having its emitter and collector electrodes connected to said control circuit at fourth and fifth junctions respectively between said third junction and said source and between said load and capacitor; the collector electrode of said control transistor being connected to the base of said output transistor whereby the latter is also connected to said control circuit at said third junction; at least one portion of said resistive impedance being between said second and third junctions and another portion being between said third and fourth junctions.

2. A circuit as defined in claim 1 wherein the time constant of said capacitor and resistive impedance is a substantial multiple of a single cycle of the series-resonant circuit defined by said load and capacitor.

References Cited in the file of this patent

UNITED STATES PATENTS

| | | |
|---|---|---|
| 2,788,449 | Bright | Apr. 9, 1957 |
| 2,831,113 | Weller | Apr. 15, 1958 |

FOREIGN PATENTS

| | | |
|---|---|---|
| 801,453 | Great Britain | Sept. 17, 1958 |